United States Patent
Liu et al.

(10) Patent No.: US 11,379,988 B2
(45) Date of Patent: Jul. 5, 2022

(54) METHOD AND APPARATUS FOR EXTRACTING EDGE OF OBJECT IN DEPTH IMAGE AND COMPUTER READABLE STORAGE MEDIUM

(71) Applicant: BOE TECHNOLOGY GROUP CO., LTD., Beijing (CN)

(72) Inventors: Tong Liu, Beijing (CN); Xiangyang Liu, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 16/615,644

(22) PCT Filed: Apr. 25, 2019

(86) PCT No.: PCT/CN2019/084392
§ 371 (c)(1),
(2) Date: Nov. 21, 2019

(87) PCT Pub. No.: WO2020/001149
PCT Pub. Date: Jan. 2, 2020

(65) Prior Publication Data
US 2021/0358132 A1    Nov. 18, 2021

(30) Foreign Application Priority Data
Jun. 29, 2018  (CN) .......................... 201810701449.9

(51) Int. Cl.
*G06T 7/13*      (2017.01)
*G06T 7/55*      (2017.01)
(Continued)

(52) U.S. Cl.
CPC ................ *G06T 7/13* (2017.01); *G06T 5/002* (2013.01); *G06T 7/12* (2017.01); *G06T 7/55* (2017.01);
(Continued)

(58) Field of Classification Search
CPC .... G06T 7/13; G06T 7/55; G06T 7/12; G06T 5/002; G06T 2207/10028; G06T 2207/2022
See application file for complete search history.

(56) References Cited

U.S. PATENT DOCUMENTS 8,983,177 B2 * 3/2015 Tuzel .................... G06T 3/4053
                                            382/154
9,305,360 B2 * 4/2016 Parfenov .................. G06T 5/50
(Continued)

FOREIGN PATENT DOCUMENTS

CN    101256625 A        9/2008
CN    101256625 A  *     9/2008
(Continued)

OTHER PUBLICATIONS

Yi Zhang, Xiaoyuan Han, Han Zhang, Liming Zhao, "Edge Detection Algorithm of Image Fusion Based on Improved Sobel Operator," 2017 IEEE Information Technology and Mechatronics Engineering Conference (ITOEC), 2017, pp. 457-461, doi: 10.1109/ITOEC.2017.8122336 (Year: 2017).*
(Continued)

*Primary Examiner* — Vincent Rudolph
*Assistant Examiner* — Xiaoli Zhang
(74) *Attorney, Agent, or Firm* — Kinney & Lange, P.A.

(57) ABSTRACT

The embodiments of the present disclosure disclose a method and apparatus for extracting an edge of an object in a depth image, a storage medium, and a computer device, to provide a solution which is simple to implement and accu-
(Continued)

Step 11: At least two sets of edge pixels of a first depth image are calculated using at least two edge detection algorithms Step 12: A final set of edge pixels is acquired based on the at least two sets of edge pixels rate in edge extraction. The method for extracting an edge of an object in a depth image includes: calculating at least two sets of edge pixels of a first depth image using at least two edge detection algorithms; and acquiring a final set of edge pixels by combining the at least two sets of edge pixels. The solution according to the embodiments of the present disclosure is simple to implement, and may obtain a more accurate set of edge pixels, thereby obtaining an accurate pixel-level segmentation result.

19 Claims, 5 Drawing Sheets

(51) Int. Cl.
*G06T 7/12* (2017.01)
*G06T 5/00* (2006.01)

(52) U.S. Cl.
CPC .............. *G06T 2207/10028* (2013.01); *G06T 2207/20221* (2013.01)

(56) References Cited

U.S. PATENT DOCUMENTS

| | | | | |
|---|---|---|---|---|
| 9,576,338 | B2* | 2/2017 | Tuzel | ............... G06T 3/4053 |
| 2011/0249910 | A1* | 10/2011 | Henderson | ......... G06K 9/00134 |
| | | | | 382/278 |
| 2014/0219547 | A1* | 8/2014 | Tuzel | ............... G06T 3/4053 |
| | | | | 382/154 |
| 2015/0193910 | A1* | 7/2015 | Tuzel | ............... G06T 3/4053 |
| | | | | 382/154 |
| 2015/0206318 | A1* | 7/2015 | Parfenov | ................... G06T 5/50 |
| | | | | 382/154 |
| 2016/0305895 | A1* | 10/2016 | Ferro | ........................ G06T 7/00 |

FOREIGN PATENT DOCUMENTS

| | | | | |
|---|---|---|---|---|
| CN | 101859385 | A | | 10/2010 |
| CN | 101859385 | A * | | 10/2010 |
| CN | 102521802 | A | | 6/2012 |
| CN | 102521802 | A * | | 6/2012 |
| CN | 103440662 | A * | | 12/2013 |
| CN | 103927717 | A | | 7/2014 |
| CN | 103927717 | A * | | 7/2014 |
| CN | 104272323 | A * | | 1/2015 ............. G06T 7/593 |
| CN | 104272323 | A | | 1/2015 |
| CN | 104954770 | A * | | 9/2015 |
| CN | 104954770 | A | | 9/2015 |
| CN | 105825494 | A * | | 8/2016 |
| CN | 105825494 | A | | 8/2016 |
| CN | 107578053 | A | | 1/2018 |
| CN | 107578053 | A * | | 1/2018 |
| CN | 108830873 | A * | | 11/2018 |
| CN | 108830873 | A | | 11/2018 |

OTHER PUBLICATIONS

Syed Mohammad Abid Hasan, Kwanghee Ko, "Depth Edge Detection by Image-based Smoothing and Morphological Operations", Journal of Computational Design and Engineering, vol. 3, Issue 3, Jul. 2016, pp. 191-197. (Year: 2016).*

Anchal Kalra and Roshan Lal Chhokar, "A Hybrid Approach Using Sobel and Canny Operator for Digital Image Edge Detection," 2016 International Conference on Micro-Electronics and Telecommunication Engineering (ICMETE), 2016, pp. 305-310, doi: 10.1109/ICMETE.2016.49 (Year: 2016).*

Haosong Yue, Weihai Chen, Jianhua Wang, and Xingming Wu, "Combining Color and Depth Data for Edge Detection", 2013 IEEE International Conference on Robotics and Biomimetics (ROBIO), 928-933. (Year: 2013).*

N. Jamil, H.C. Soh, T.M. Tengku Sembok, Z.A. Bakar, "A Modified Edge-based Region Growing Segmentation of Geometric Objects." In Badioze Zaman H. et al. (eds) Visual Informatics: Sustaining Research and Innovations. IVIC 2011. Lecture Notes in Computer Science, vol. 7066, Springer, Berlin, Heidelberg. (Year: 2011).*

Stamatia Giannarou and Tania Stathaki, "Optimal Edge Detection using Multiple Operators for Image Understanding," EURASIP Journal on Advances in Signal Processing 2011, 2011: 28 (Year: 2011).*

First Chinese Office Action dated Jun. 2, 2021, received for corresponding Chinese Application No. 201810701449.9, 14 pages.

* cited by examiner

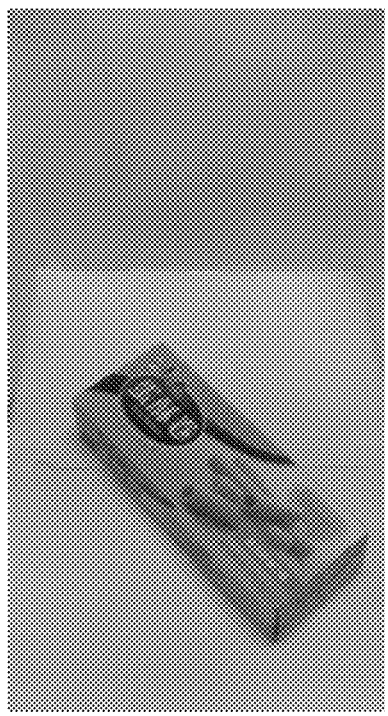
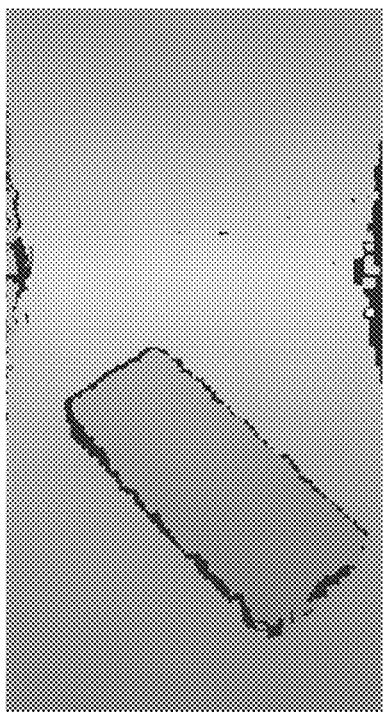
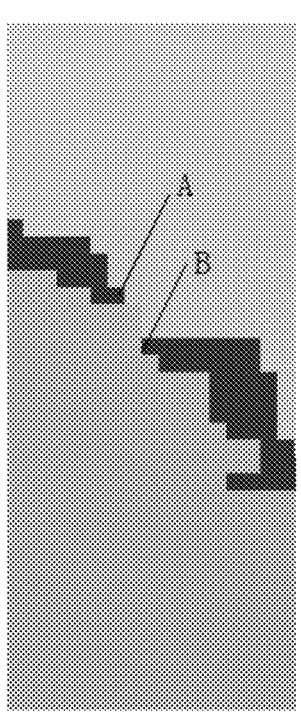
Fig. 6A  Fig. 6B  Fig. 6C
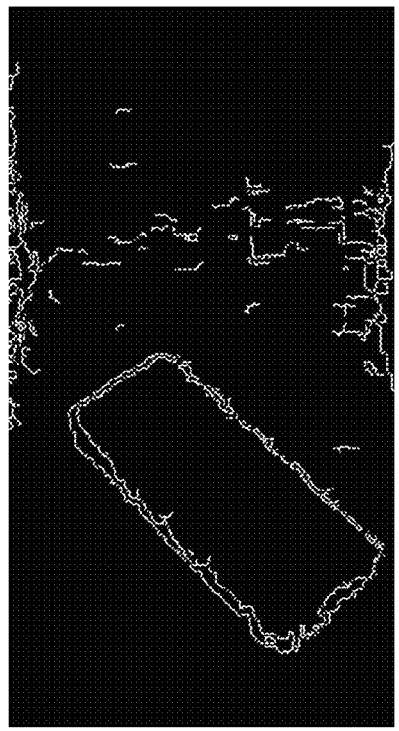
Fig. 7

METHOD AND APPARATUS FOR EXTRACTING EDGE OF OBJECT IN DEPTH IMAGE AND COMPUTER READABLE STORAGE MEDIUM

CROSS-REFERENCE TO RELATED APPLICATION(S)

This application is the national phase of PCT application No. PCT/CN2019/084392, filed on Apr. 25, 2019, entitled "METHOD AND APPARATUS FOR EXTRACTING EDGE OF OBJECT IN DEPTH IMAGE AND COMPUTER READABLE STORAGE MEDIUM", which in turn claims priority to the Chinese Patent Application No. 201810701449.9, filed on Jun. 29, 2018, entitled "METHOD AND APPARATUS FOR EXTRACTING EDGE OF OBJECT IN DEPTH IMAGE, MEDIUM AND COMPUTER DEVICE", which are incorporated herein by reference in their entireties.

TECHNICAL FIELD

The present disclosure relates to image processing technology, and more particularly, to a method and apparatus for extracting an edge of an object in a depth image, a storage medium and a computer device.

BACKGROUND

A depth camera acquires depth information by emitting infrared structured light and receiving a reflected light beam obtained by the infrared structured light being reflected by an object to calculate a distance from a surface of the object to the camera. Some related depth image segmentation methods are based on random Hough transform, some related depth image segmentation methods are based on normal component edge fusion, some related depth image segmentation methods are based on morphological waterline regions, and some related depth image segmentation methods are based on mathematical morphology; however, all of these depth image segmentation methods are relatively complicated.

SUMMARY

In order to solve or at least alleviate the above technical problem, embodiments of the present disclosure provide a method and apparatus for extracting an edge of an object in a depth image, a storage medium and a computer device.

According to some embodiments of the present disclosure, there is provided a method for extracting an edge of an object in a depth image. The method comprises: calculating at least two sets of edge pixels of a first depth image using at least two edge detection algorithms; and acquiring a final set of edge pixels based on the at least two sets of edge pixels.

In some embodiments, before calculating at least two sets of edge pixels of a first depth image using at least two edge detection algorithms, the method further comprises: determining at least one frame of relevant depth image related to a depth image to be segmented; and fusing the determined relevant depth image with the depth image to be segmented for one or more times to obtain the first depth image.

In some embodiments, the at least two sets of edge pixels comprise a base set of edge pixels and at least one other set of edge pixels.

In some embodiments, the step of acquiring a final set of edge pixels based on the at least two sets of edge pixels comprises: compensating for the base set of edge pixels with the at least one other set of edge pixels to obtain the final set of edge pixels, wherein the base set of edge pixels is calculated using a first edge detection algorithm, and the at least one other set of edge pixels is calculated using at least one other edge detection algorithm.

In some embodiments, the step of acquiring a final set of edge pixels based on the at least two sets of edge pixels comprises: taking a union of the at least two sets of edge pixels as the final set of edge pixels.

In some embodiments, the step of acquiring a final set of edge pixels based on the at least two sets of edge pixels comprises performing the following processing for each pixel: including the pixel in the final set of edge pixels when a number of sets of edge pixels containing the pixel exceeds a second preset threshold.

In some embodiments, the step of compensating for the base set of edge pixels with the at least one other set of edge pixels comprises: adding the base set of edge pixels to the final set of edge pixels; and performing the following processing for the at least one other set of edge pixels: selecting, from the other sets of edge pixels, a pixel directly connected to a pixel in the final set of edge pixels and adding the pixel to the final set of edge pixels.

In some embodiments, the step of calculating at least two sets of edge pixels of a first depth image using at least two edge detection algorithms comprises: determining the at least two edge detection algorithms; determining a number of frames to be processed for each of the edge detection algorithms based on weight values preset for the edge detection algorithms; and calculating, using the determined edge detection algorithms, relevant depth images related to the first depth image according to the respective determined numbers of frames to obtain sets of edge pixels, wherein the step of acquiring a final set of edge pixels based on the at least two sets of edge pixels comprises performing the following processing for each pixel in the first depth image: including the pixel in the final set of edge pixels when a number of sets of edge pixels containing the pixel exceeds a first preset threshold.

In some embodiments, the first edge detection algorithm is to extract pixels having a depth value of zero.

In some embodiments, the method further comprises: performing connected domain analysis on the final set of edge pixels to obtain a segmentation result.

In some embodiments, the method further comprises: de-noising the segmentation result according to priori information.

According to some other embodiments of the present disclosure, there is provided an apparatus for extracting an edge of an object in a depth image. The apparatus comprises: a processor; and a memory having stored thereon instructions which, when executed by the processor, cause the processor to: calculate at least two sets of edge pixels of a first depth image using at least two edge detection algorithms; and acquire a final set of edge pixels based on the at least two sets of edge pixels.

In some embodiments, the instructions which, when executed by the processor, further cause the processor to: determine at least one frame of relevant depth image related to a depth image to be segmented; and fuse the determined relevant depth image with the depth image to be segmented for one or more times to obtain the first depth image.

In some embodiments, the at least two sets of edge pixels comprise a base set of edge pixels and at least one other set of edge pixels.

In some embodiments, the instructions which, when executed by the processor, further cause the processor to: compensate for the base set of edge pixels with the at least one other set of edge pixels to obtain the final set of edge pixels, wherein the base set of edge pixels is calculated using a first edge detection algorithm, and the at least one other set of edge pixels is calculated using at least one other edge detection algorithm.

In some embodiments, the instructions which, when executed by the processor, further cause the processor to: take a union of the at least two sets of edge pixels as the final set of edge pixels.

In some embodiments, the instructions which, when executed by the processor, further cause the processor to perform the following processing for each pixel: including the pixel in the final set of edge pixels when a number of sets of edge pixels containing the pixel exceeds a second preset threshold.

In some embodiments, the instructions which, when executed by the processor, further cause the processor to: add the base set of edge pixels to the final set of edge pixels; and perform the following processing for the at least one other set of edge pixels: selecting, from the other sets of edge pixels, a pixel directly connected to a pixel in the final set of edge pixels and adding the pixel to the final set of edge pixels.

In some embodiments, the instructions which, when executed by the processor, further cause the processor to: determine the at least two edge detection algorithms; determine a number of frames to be processed for each of the edge detection algorithms based on weight values preset for the edge detection algorithms; calculate, using the determined edge detection algorithms, relevant depth images related to the first depth image according to the respective determined numbers of frames to obtain sets of edge pixels; and perform the following processing for each pixel in the first depth image: including the pixel in the final set of edge pixels when a number of sets of edge pixels containing the pixel exceeds a first preset threshold.

In some embodiments, the instructions which, when executed by the processor, further cause the processor to: perform connected domain analysis on the final set of edge pixels to obtain a segmentation result.

In some embodiments, the instructions which, when executed by the processor, further cause the processor to: de-noise the segmentation result according to priori information.

According to some embodiments of the present disclosure, there is provided a computer readable storage medium having stored thereon a computer program which, when executed by a processor, implement steps of the method described above.

BRIEF DESCRIPTION OF THE ACCOMPANYING DRAWINGS

The accompanying drawings are used to provide a further understanding of the technical solutions of the present disclosure, and constitute a part of the specification. The accompanying drawings are used together with the embodiments of the present application to explain the technical solutions of the present disclosure, and do not constitute a limitation of the technical solutions of the present disclosure. Shapes and sizes of various components in the accompanying drawings do not reflect true proportions, and are merely intended to illustrate the present disclosure.

FIG. 6A is an original image of an image to be segmented according to an application example of the present disclosure;

FIG. 6B is a depth image of an image to be segmented according to an application example of the present disclosure;

FIG. 6C is a partial view of a depth image of an image to be segmented according to an application example of the present disclosure;

FIG. 7 is a diagram of a Canny edge detection result according to an application example of the present disclosure;

DETAILED DESCRIPTION

Detailed description of the present disclosure will be further described in detail below in conjunction with the accompanying drawings and embodiments. The following embodiments are intended to illustrate the present disclosure, but are not intended to limit the scope of the present disclosure. It should be illustrated that, the embodiments in the present application and features in the embodiments may be arbitrarily combined with each other without a conflict.

Figure 1:
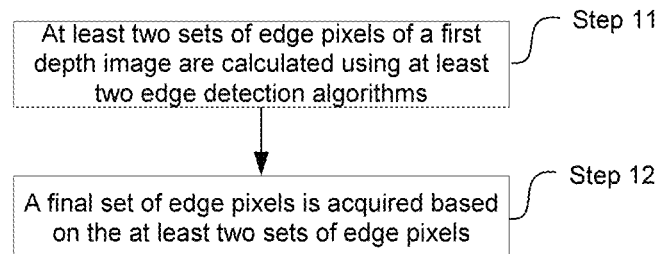
FIG. 1 is a flowchart of a method for extracting an edge of an object in a depth image according to an embodiment of the present disclosure.

FIG. 1 is a flowchart of a method for extracting an edge of an object in a depth image according to an embodiment of the present disclosure. As shown in FIG. 1, the method comprises the following steps.

In step 11, at least two sets of edge pixels of a first depth image are calculated using at least two edge detection algorithms.

In step 12, a final set of edge pixels is acquired based on the at least two sets of edge pixels.

When a single object is segmented from a depth image of the object, an accurate and stable result may not be obtained using only a set of zero-value pixels or edge pixels of a single frame of image due to the influence of noise. Therefore, the embodiments of the present disclosure propose to obtain at least two sets of edge pixels using at least two edge detection algorithms, and obtain a more accurate final set of edge pixels by combining the sets of edge pixels, thereby achieving stable and accurate pixel-level object segmentation.

In an alternative embodiment, in order to eliminate the influence of noise, before calculating at least two sets of edge pixels of a first depth image using at least two edge detection algorithms, the method may further comprise a step of determining at least one frame of relevant depth image related to a depth image to be segmented, and fusing the determined relevant depth image with the depth image to be segmented for one or more times to obtain the first depth image. The first depth image is obtained by fusing multiple frames of depth images, and the set of edge pixels obtained based on the first depth image has large accuracy, less noise, and a better segmentation effect. The relevant depth image related to the depth image to be segmented is an image which has substantially the same content as that of the depth image to be segmented, and may be at least one frame of depth image before the depth image to be segmented, or may also be at least one frame of depth image after the depth image to be segmented, or a combination thereof. The first depth image may be the fused depth image as described above, or may also be the depth image to be segmented itself.

For the flow illustrated in FIG. 1, one manner is to calculate, for the same first depth image, a corresponding set of edge pixels of the first depth image using each of the determined edge detection algorithms, and combine the obtained at least two sets of edge pixels to obtain a final set of edge pixels. In this manner, a number of the sets of edge pixels obtained is the same as a number of the edge detection algorithms. The first depth image may be the depth image to be segmented itself or the first depth image obtained by fusing the depth image to be segmented with the relevant depth images as described above.

In an alternative embodiment, calculating the at least two sets of edge pixels of the first depth image in the above step 11 comprises: acquiring a base set of edge pixels of the first depth image using a first edge detection algorithm, and calculating at least one other set of edge pixels of the first depth image using at least one other edge detection algorithm; and acquiring the final set of edge pixels based on the at least two sets of edge pixels described in the above step 12 comprises: compensating for the base set of edge pixels with the at least one other set of edge pixels to obtain the final set of edge pixels. In addition to the above combination manner, other combination manners may also be used, for example, taking a union of the at least two sets of edge pixels as the final set of edge pixels; or performing the following processing for each pixel: including the pixel in the final set of edge pixels when a number of sets of edge pixels containing the pixel exceeds a second preset threshold.

Here, during the compensation, the base set of edge pixels may firstly be added to the final set of edge pixels, and then the at least one other set of edge pixels is processed as follows: selecting, from the other sets of edge pixels, a pixel directly connected to a pixel in the final set of edge pixels and including the pixel in the final set of edge pixels, until all other sets of edge pixels have no pixel which is directly connected to a pixel in the final set of edge pixels. The direct connection may be four connected domain connection or eight connected domain connection, that is, for any pixel x, pixels at four immediately adjacent positions of the pixel, that is, an upper position, a lower position, a left position and a right position, may be considered as being directly connected, or pixels at four immediately adjacent positions and four obliquely adjacent positions of the pixel, that is, an upper position, a lower position, a left position, a right position, an upper left position, an upper right position, a lower left position and a lower right position, may be considered as being directly connected. The present embodiment provides a simple and reliable compensation algorithm. In addition to the compensation algorithm, other relevant compensation algorithms are not excluded for calculation. Segmentation based on the compensated set of edge pixels may achieve a pixel-level segmentation effect.

For the flow illustrated in FIG. 1, another manner is to calculate relevant depth images related to the first depth image using the determined edge detection algorithms to obtain at least two sets of edge pixels, and fuse the obtained at least two sets of edge pixels to obtain the final set of edge pixels. In this manner, a number of the sets of edge pixels obtained is the same as a number of the relevant depth images, that is, each frame of depth image is used to obtain a corresponding set of edge pixels.

Specifically, the at least two edge detection algorithms are determined; a number of frames to be processed for each of the edge detection algorithms is determined according to weight values preset for the edge detection algorithms; the relevant depth images related to the first depth image are calculated using the respective determined edge detection algorithms according to the respective determined numbers of frames, to obtain sets of edge pixels; and for each pixel in the first depth image, the following processing is performed: including the pixel in the final set of edge pixels when a number of sets of edge pixels containing the pixel exceeds a first preset threshold.

Here, the first preset threshold may be the same as or different from the above second preset threshold.

Here, the first depth image may be a determined depth image to be segmented. In this case, the relevant depth images related to the first depth image comprise the depth image to be segmented and relevant depth images related to the depth image to be segmented, wherein the relevant depth images related to the depth image to be segmented may be at least one frame of depth image before the depth image to be segmented, or at least one frame of depth image after the first depth image, or a combination thereof. In a specific implementation, for the sake of simplicity, corresponding depth images may be directly selected according to a total number of frames as the relevant depth images related to the first depth image. In addition, the first depth image may also be a fused depth image. In this case, the relevant depth images related to the first depth image may comprise: the first depth image, the depth image to be segmented, and the relevant depth images related to the depth image to be segmented. Since the depth images which are processed using the edge detection algorithms are all related to the first depth image, the sets of edge pixels obtained in this manner are still referred to as the sets of edge pixels of the first depth image.

In an alternative embodiment, in this manner, a number of frames of a depth image which is processed using each of the edge detection algorithms is determined according to weight values preset for the edge detection algorithms in, for example, one of the following ways:

directly determining a number of frames of the depth image which is processed using each of the edge detection algorithms, i.e., determining a weight value for each of the edge detection algorithms, and multiplying the weight value for the edge algorithm by a preset parameter to obtain a number of frames of the depth image which is processed using the edge detection algorithm. For example, if two edge detection algorithms are determined and correspond to weight values of w1 and w2, and a preset parameter a is determined to be a positive integer not less than 1, a number of frames of an image which is processed using a first edge detection algorithm is w1*a, and a number of frames of an image which is processed using a second edge detection algorithm is w2*a; or firstly determining a total number of frames of the relevant depth images related to the first depth image, and then determining a number of frames of a depth image which is processed using each of the edge detection algorithms according to weight values for the edge detection algorithms, i.e., determining a total number n of frames of the relevant depth images related to the first depth image, and determining a number of frames of a depth image which is processed using each of the edge detection algorithms according to weight values for the edge detection algorithms. For example, if two edge detection algorithms are determined, a weight value for a first edge detection algorithm is w1, a number of frames of a depth image which is processed using the first edge detection algorithm is n1, a weight value for a second edge detection algorithm is w2, and a number of frames of a depth image which is processed using the second edge detection algorithm is n2, w1/w2=n1/n2, and n1+n2=n. In some embodiments, an edge detection algorithm with a better effect or a more reliable result has a higher weight value than other edge detection algorithms.

In an alternative embodiment, when a number of sets of edge pixels containing the pixel exceeds a first preset threshold, the pixel is included in the final set of edge pixels, wherein the first preset threshold, may, for example, may be set to half of the number of the sets of edge pixels, that is, if more than half of the sets of pixels contain a pixel A, the pixel A is included in the final set of edge pixels; otherwise, the pixel A is not included in the final set of edge pixels.

In the present embodiment, the edge detection algorithms which may be used comprise, for example, a zero-value pixel acquisition algorithm, a Canny edge detection algorithm, a Roberts edge detection algorithm, a Prewitt edge detection algorithm, a Sobel edge detection algorithm, a Laplacian edge detection algorithm, a Log edge detection algorithm, etc. In some embodiments, the first edge detection algorithm is a zero-value pixel acquisition algorithm which extracts pixels having a depth value of zero.

In an alternative embodiment, the method further comprises: performing connected domain analysis on the final set of edge pixels to obtain a segmentation result, and de-noising the segmentation result according to priori information. The priori information comprises, for example, but not limited to, one or more of location information, size information, shape information etc. of the object, and a segmentation result generated by a target (i.e., noise) which is not an object may be removed by de-noising the segmentation result according to the priori information.

With the method according to the present embodiment, at least two edge detection algorithms are used to calculate at least two sets of edge pixels of the first depth image, and the final set of edge pixels is acquired based on the at least two sets of edge pixels. In this way, a more accurate final set of edge pixels is obtained by combining multiple sets of edge pixels, so as to achieve stable and accurate pixel-level object segmentation.

Figure 2:
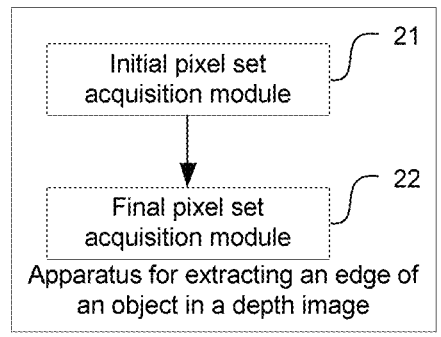
FIG. 2 is a schematic structural diagram of an apparatus for extracting an edge of an object in a depth image according to an embodiment of the present disclosure.

In another embodiment, there is provided an apparatus for extracting an edge of an object in a depth image for realizing the method in the above embodiments, and thus the description in the above embodiments is also applicable to the present embodiment. FIG. 2 is a schematic structural diagram of the apparatus which may be used to realize the method according to the above embodiments. As shown in FIG. 2, the apparatus for extracting an edge of an object in a depth image comprises an initial pixel set acquisition module 21 and a final pixel set acquisition module, wherein the initial pixel set acquisition module 21 is configured to calculate at least two sets of edge pixels of a first depth image using at least two edge detection algorithms; and the final pixel set acquisition module 22 is configured to acquire a final set of edge pixels based on the at least two sets of edge pixels.

Figure 3:
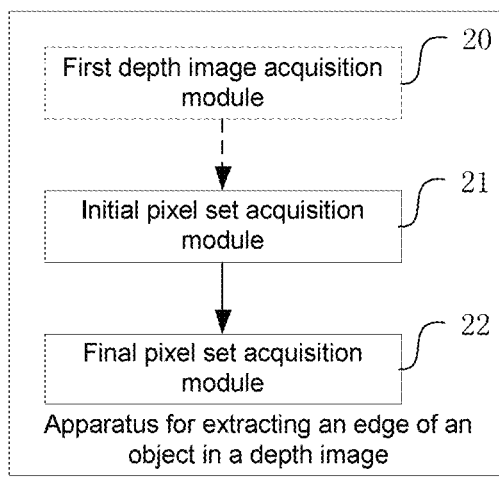
FIG. 3 is a schematic structural diagram of an apparatus for extracting an edge of an object in a depth image according to another embodiment of the present disclosure.

As shown in FIG. 3, in still another alternative embodiment, the apparatus may further comprise a first depth image acquisition module 20, configured to determine at least one frame of relevant depth image related to a depth image to be segmented; and fuse the determined relevant depth images with the depth image to be segmented for one or more times to obtain the first depth image.

In an alternative embodiment, the final pixel set acquisition module 22 obtains the final set of edge pixels based on the at least two sets of edge pixels by compensating for, by the final pixel set acquisition module 22, a base set of edge pixels with at least one other set of edge pixels to obtain the final set of edge pixels, wherein the base set of edge pixels is calculated using a first edge detection algorithm, and the at least one other set of edge pixels is calculated using at least one other edge detection algorithm; or taking, by the final pixel set acquisition module 22, a union of the at least two sets of edge pixels as the final set of edge pixels; or performing, by the final pixel set acquisition module 22, the following processing for each pixel: including the pixel in the final set of edge pixels when a number of sets of edge pixels containing the pixel exceeds a second preset threshold.

An alternative compensation manner is as follows. The final pixel set acquisition module 22 adds the base set of edge pixels to the final set of edge pixels; and performs the following processing for the at least one other set of edge pixels: selecting, from the other sets of edge pixels, a pixel directly connected to a pixel in the final set of edge pixels and adding the pixel to the final set of edge pixels.

In an alternative embodiment, the initial pixel set acquisition module 21 calculates at least two sets of edge pixels of a first depth image using at least two edge detection algorithms by:

determining, by the initial pixel set acquisition module 21, the at least two edge detection algorithms; determining a number of frames to be processed for each of the edge detection algorithms according to weight values preset for the edge detection algorithms; and calculating the relevant depth images related to the first depth image using the determined edge detection algorithms according to the respective determined numbers of frames, to obtain sets of edge pixels.

The final pixel set acquisition module 22 obtains the final set of edge pixels based on the at least two sets of edge pixels by performing, by the final pixel set acquisition module 22, processing for each pixel in the first depth image: including the pixel in the final set of edge pixels when a number of sets of edge pixels containing the pixel exceeds a first preset threshold.

Figure 4:
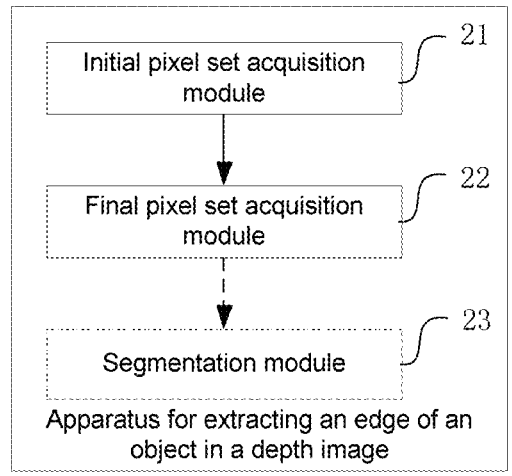
FIG. 4 is a schematic structural diagram of an apparatus for extracting an edge of an object in a depth image according to still another embodiment of the present disclosure.

As shown in FIG. 4, in an alternative embodiment, the apparatus may further comprise a segmentation module 23 configured to perform connected domain analysis on the final set of edge pixels to obtain a segmentation result and de-noise the segmentation result according to priori information.

With the apparatus according to the present embodiment, a plurality of sets of edge pixels are obtained using a plurality of different edge detection algorithms, and a more accurate final set of edge pixels is obtained by combining the plurality of sets of edge pixels, thereby realizing stable and accurate pixel-level object segmentation.

In the present example, the method according to the above embodiments is specifically described by taking an example of performing depth image fusion and compensating for the basic set of edge pixels with one set of edge pixels. Other embodiments may be performed with reference to the present example. In the present example, the base set of edge pixels is obtained using a zero value pixel acquisition method; however, the present disclosure is not limited thereto. The edge pixel is a pixel at an edge of an object in an image. Stable and accurate object segmentation may be achieved by accurately acquiring the edge pixels of the object in the image.

Figure 5:
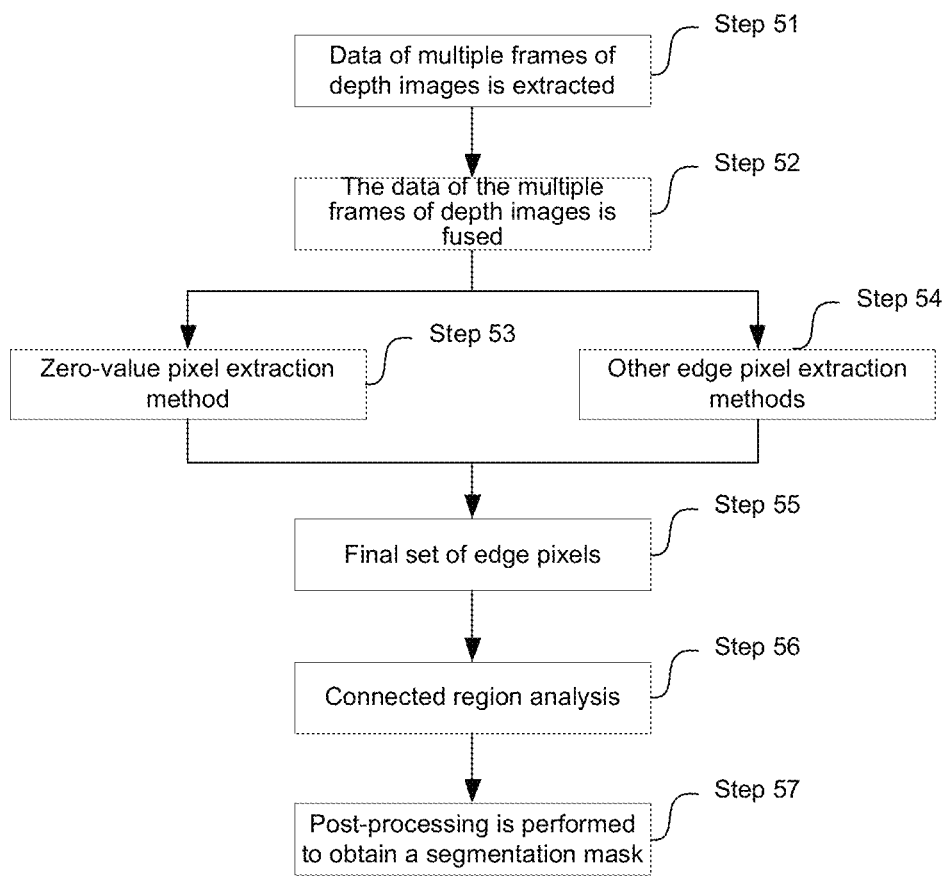
FIG. 5 is a flowchart of an application example according to an embodiment of the present disclosure.

As shown in FIG. 5, the following steps are included.

In step 51, multiple frames of depth images of an object in a still scene are extracted, one frame of depth image of the multiple frames of depth images is determined to be a depth image to be segmented, and other frames of depth images are determined to be relevant depth images related to the depth image to be segmented.

In the present embodiment, the depth image refers to an image containing depth information which is acquired by a depth camera. For example, the depth camera emits infrared structured light, receives a reflected light beam obtained by the infrared structured light being reflected by the object, and determines information of a distance from a surface of the object to the camera according to the reflected light beam, wherein the information of the distance is the depth information.

The relevant depth image related to the depth image to be segmented is an image which is within the same preset time window as that of the depth image to be segmented, and may be, for example, at least one frame of depth image before the depth image to be segmented, or may also be at least one frame of depth image after the image to be segmented, or a combination thereof.

In step 52, the extracted multiple frames of depth images are fused to obtain a first depth image.

Since the depth information in the depth image is acquired using the reflected light, and an imaging unit for receiving the reflected light may not receive reflected light at an edge of the object due to a change in angle at the edge of the object, most of pixels at the edge of the object in the depth image each have a depth of zero, that is, most of the pixels are zero-value pixels. However, in consideration of light, a set of zero-value pixels at an edge of an object in a single image may be less stable. For example, a certain pixel in the image has a pixel value of zero at time t1, but does not have a pixel value of zero at time t2. Therefore, in order to eliminate the influence of noise as much as possible, multiple frames of depth images of an object in a still scene, including a depth image to be segmented and relevant depth images, are firstly extracted, and then are fused to obtain one image, i.e., a first depth image. In other application examples, instead of fusing, a depth image to be segmented may be directly selected as the first depth image.

For zero-value pixels in the depth image, fusion may performed using one of the following methods: a union method, an intersection method, a threshold method, a continuous interval method, etc., and non-zero value pixels in the depth image, i.e., ordinary pixels, may be fused using mean filtering. For continuous N frames of depth images, the so-called union method is to take a union of sets of zero-value pixels for all frames; similarly, the intersection method is to take an intersection of the sets of zero-value pixels for all frames; and the threshold method is to count, for each pixel, a number $N_0$ of frames for which the pixel has a value of zero, when No is greater than a preset threshold $N_{th1}$, the pixel is considered to be a zero-value pixel; otherwise, the pixel is considered to be not a zero-value pixel, for example, if nine frames of images are counted, when a pixel has a value of zero for five frames or more, the pixel is considered to be a zero-value pixel, and vice versa. The continuous interval method is to count, for each pixel, a length $N_{length}$ of a sequence of continuous frames for which the pixel has a value of zero, and if $N_{length}$ is greater than another preset threshold $N_{th2}$, the pixel is considered to be a zero-value pixel. Different models are used for different depth sensor noises. In practical applications, these fusion methods may be used to perform experiments respectively, and a best result may be obtained. Alternatively, results of different fusion methods may be re-fused, that is, fused multiple times. Stability of the set of zero-value pixels may be improved by multi-frame fusion.

In step 53, a set ($P_0$) of pixels having depth data of zero is extracted from the first depth image using a first edge detection algorithm as a basic set of edge pixels.

In some embodiments, an algorithm which realizes a relatively reliable edge effect is selected as the first edge detection algorithm. As described above, based on characteristics of the depth information in the depth image, the first edge detection algorithm in this example is a zero-value pixel extraction method, i.e., extracting pixels having depth data of zero to constitute the basic set of edge pixels. As shown in FIG. 6A and FIG. 6B, FIG. 6A is an original image, and FIG. 6B is a depth image corresponding to the extracted basic set of edge pixels, wherein dark dots in the figure are pixels each having a depth value of zero.

In step 54, a set ($P_c$) of edge pixels of the depth image is extracted using a second edge detection algorithm as a second set of edge pixels.

Due to noise etc., an edge formed by a set of pixels having a depth value of zero may not be closed, and may have a broken portion, as shown in FIG. 6B. FIG. 6C is a partial view of FIG. 6B, in which by taking pixels A and B on an edge as an example, the pixel A and the pixel B are disconnected, which indicates that pixels between the pixel A and the pixel B are missing in the first set of edge pixels, and therefore edge pixels in the first depth image may be extracted using other edge detection algorithms to obtain other sets of edge pixels, and the basic pixel set is compensated with the other sets of edge pixels. For example, a second set of edge pixels is obtained using a second edge detection algorithm. If the edge of the object displayed using the set of edge pixels obtained by compensating for the basic set of edge pixels with the second set of edge pixels still has missing edge pixels, that is, the edge is not closed, a third edge detection algorithm may further be selected to obtain a third set of edge pixels, and compensation continues to be performed using the third set of edge pixels, and so on, until a final set of edge pixels of a closed edge is obtained.

In this example, related edge detection algorithms may be used as the other edge detection algorithms. In this example, the Canny edge detection algorithm is used, which firstly applies Gaussian filtering to smooth an image to remove noise; then finds an intensity gradient in the image. A basic idea of the algorithm is to find a position with the strongest change in grayscale intensity in an image. The so-called strongest change is referred to as the gradient direction. Two kinds of data are required, that is, intensity information of the gradient and direction information of the gradient. Gradients of the image in a horizontal direction and a vertical direction are calculated, gradient identity and a gradient direction of each pixel of the image are calculated according to the gradients; and then non-maximum suppression is performed to refine an edge, so that a blur boundary becomes clear, in simply words, retain a maximum value of the gradient intensity at each pixel and delete other values. After the non-maximum suppression is performed, there are still many noise pixels in the image, that is, non-edge pixels may be contained in the result. A double threshold method is applied to implement edge selection, that is, a threshold upper bound and a threshold lower bound are set, if a pixel in the image is greater than the threshold upper bound, the pixel is considered to be definitely an edge pixel, if a pixel in the image is less than the threshold lower threshold, the pixel is considered to be definitely not an edge pixel, and pixels between the threshold upper bound and the threshold lower bound are further determined. A binarized output result of edge extraction is shown in FIG. 7. In addition, other related edge detection methods, for example, first-order differential operators such as Roberts operator, Prewitt operator, Sobel operator, etc., and second-order differential operators such as Laplacian operator, LOG operator etc. may be used to calculate an edge of the depth image.

In some embodiments, in order to directly use the above related edge detection algorithms, the first depth image obtained in step 52 may be firstly mapped into a grayscale image, for example, the first depth image is converted, so that depth information thereof is converted to be within a range of 0-255. The depth information may be multiplied by a conversion coefficient (or a scaling factor), so that a value thereof is within the range of 0-255. Edge extraction may be performed on the converted first depth image using the Canny edge detection algorithm to obtain the result shown in FIG. 7.

In step 55, the base set of edge pixels is compensated with the second set of edge pixels to obtain a candidate set ($P_E$) of edge pixels, that is, a final set of edge pixels.

The base set ($P_O$) of edge pixels is combined with the second set ($P_C$) of edge pixels to obtain a more complete edge ($P_E$) of the object.

In some embodiments, considering that pixels in $P_O$ may be more reliable, all the pixels in $P_O$ firstly enter into $P_E$. If a pixel p in $P_C$ is required to enter $P_E$, it is required that p must be directly or indirectly connected to a pixel in $P_O$, that is, there is a path pp' from p to a certain pixel p' in $P_O$, and each pixel on the path belongs to $P_O$ or $P_E$. Alternatively, all pixels in $P_O$ firstly enter $P_E$, and then it is determined whether a pixel p in $P_C$ is connected to any pixel in $P_E$, and if so, the pixel p is added to $P_E$ until the determination is made for all the pixels in $P_C$. In a case where all the pixels in $P_O$ enter into $P_E$, the connection may refer to direct connection, which may be four connected domain connection or eight connected domain connection, that is, for any pixel x, pixels at four immediately adjacent positions of the pixel, that is, an upper position, a lower position, a left position and a right position, may be considered as being directly connected, or pixels at four immediately adjacent positions and four obliquely adjacent positions of the pixel, that is, an upper position, a lower position, a left position, a right position, an upper left position, an upper right position, a lower left position and a lower right position, may be considered as being directly connected.

In addition to the above combination scheme, a combination manner in which a union is taken may further be used, for example, a union of at least two sets of edge pixels may be taken as a final set of edge pixels, that is, as long as one edge detection algorithm considers that a pixel is located at an edge, the pixel is included in the final set of edge pixels.

In addition, the combination may also be performed in a voting manner, that is, the following processing is performed for each pixel: when a number of sets of edge pixels containing the pixel exceeds a second preset threshold, the pixel is added to the final set of edge pixels. For example, an odd number of sets of edge pixels of the first depth image are calculated using an odd number of edge detection algorithms, and for each pixel, if more than half of the sets of edge pixels contain the pixel, that is, more than half of the edge detection algorithms considers that the pixel is located at an edge, the pixel is included in the final set of edge pixels; otherwise, the pixel is not included in the final set of edge pixels.

In this example, the base set of edge pixels is compensated with the second set of edge pixels to obtain a closed edge, and therefore there is no need to use other sets of edge pixels for compensation. If the final set of edge pixels obtained by compensating for the basic set of edge pixels with the second set of edge pixels still has missing pixels, another edge detection algorithm may be selected to obtain a third set of edge pixels, and the final set of edge pixels having missing pixels at an edge is compensated with the third set of edge pixels until the final set of edge pixels of the closed edge is obtained.

In step 56, connected domain analysis is performed on the obtained final set of edge pixels to obtain a contour corresponding to the object.

Figure 8:
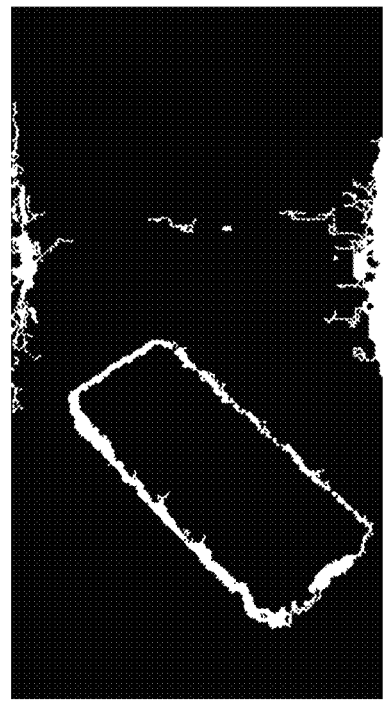
FIG. 8 is a diagram of a binarization result of performing connected domain analysis on a final set of edge pixels according to an application example of the present disclosure.

FIG. 8 illustrates a result of the connected domain analysis. It may be seen that a more accurate final set of edge pixels is obtained by compensating for the basic set ($P_O$) of edge pixels with the second set ($P_C$) of edge pixels, and a pixel-level effect may be achieved using a segmentation result which is obtained based on the final set of edge pixels.

In step 57, post-processing is performed to obtain a segmentation mask.

Figure 9:
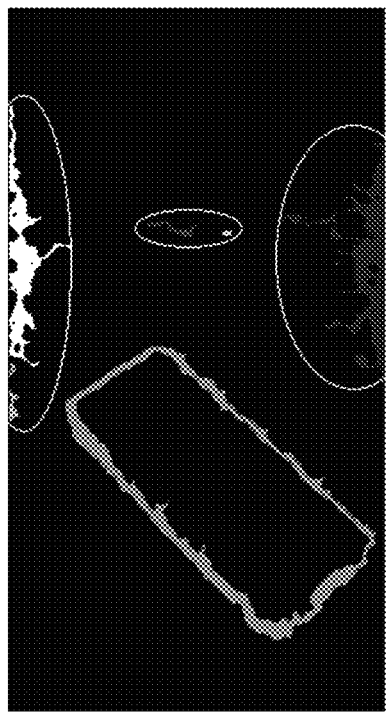
FIG. 9 is a segmentation result generated by noise according to an application example of the present disclosure.

Due to the influence of noise, multiple segmentation results may be obtained. A segmentation result in a circle in FIG. 9 is a segmentation result caused by noise. In order to remove the segmentation result caused by noise, the staff may input priori information in advance, comprising one or more of: position information, size information, and shape information of the object, and after the segmentation results are obtained, a segmentation result which does not meet a condition is automatically removed according to the priori information which is input in advance.

Figures 10A, 10B:
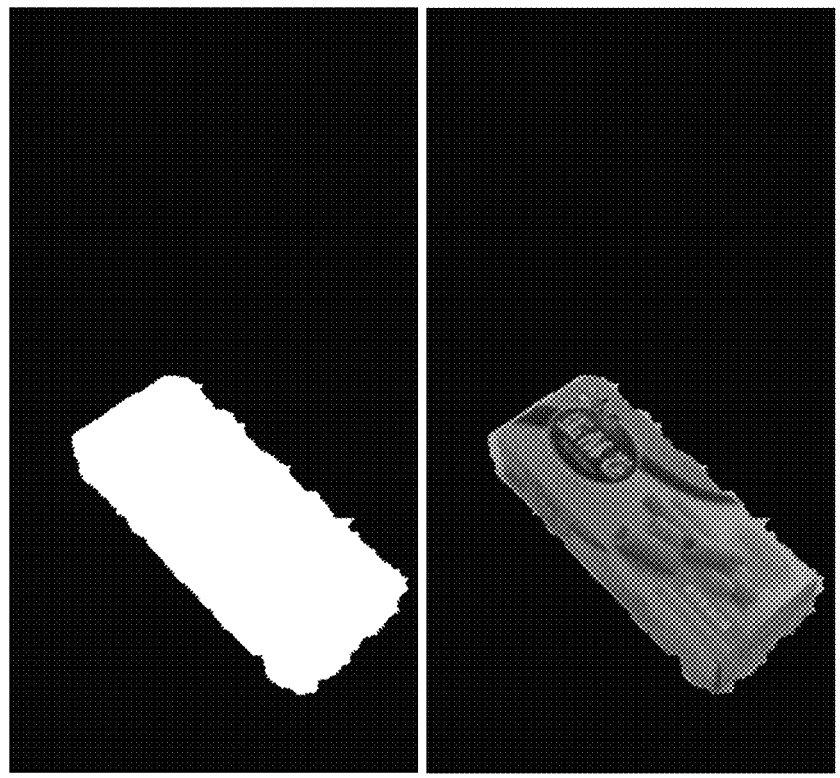
FIG. 10A is a final segmentation result of a depth image according to an application example of the present disclosure.
FIG. 10B is a diagram of a correspondence relationship between a final segmentation result and an original image according to an application example of the present disclosure.

The only connected region in FIG. 10A is the final segmentation result. It may be seen by comparing the original image with the final segmentation result that the final segmentation result which is obtained using the method according to the present example just segment the object from the foreground of the original image, as shown in FIG. 10B.

Other design requirements are similar to those in the above embodiments, and will not be described herein again.

The embodiments of the present disclosure further provide a computer storage medium, having a computer program stored thereon. The computer program, after executed, may implement the segmentation method according to one or more of the above embodiments, for example, the method shown in FIG. 1.

The embodiments of the present disclosure further provide a computer device, comprising a memory, a processor, and a computer program stored on the memory and executable on the processor, wherein the program, when executed by the processor, may implement the segmentation method according to one or more of the above embodiments.

Figure 11:
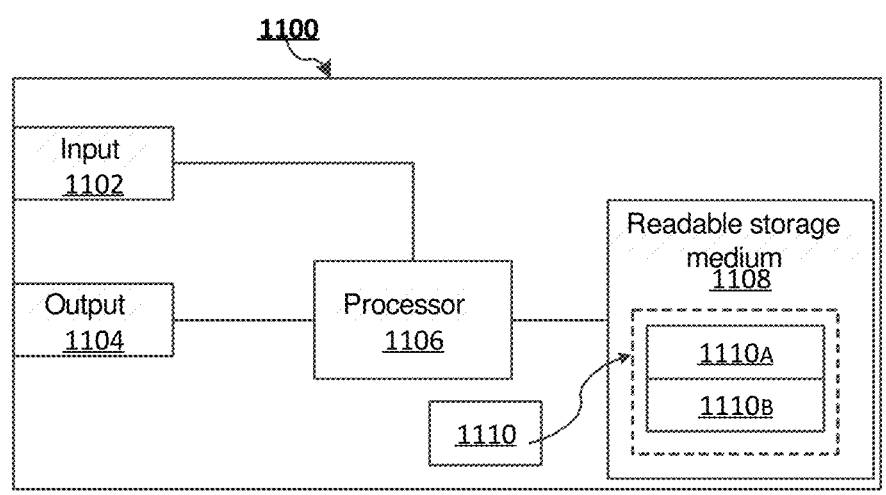
FIG. 11 is a diagram of a hardware layout of an apparatus for extracting an edge of an object in a depth image according to an embodiment of the present disclosure.

FIG. 11 is a diagram of a hardware arrangement of an apparatus 1100 for extracting an edge of an object in a depth image according to an embodiment of the present disclosure. The hardware arrangement 1100 comprises a processor 1106 (for example, a Digital Signal Processor (DSP), a Central Processing Unit (CPU) etc.) The processor 1106 may be a single processing unit or a plurality of processing units for performing different actions of the flow described herein. The arrangement 1100 may also comprise an input unit 1102 for receiving signals from other entities, and an output unit 1104 for providing signals to other entities. The input unit 1102 and the output unit 1104 may be arranged as a single entity or separate entities.

In addition, the arrangement 1100 may comprise at least one readable storage medium 1108 in a form of non-volatile or volatile memory, such as an Electrically Erasable Programmable Read-Only Memory (EEPROM), a flash memory, and/or a hard disk driver. The readable storage medium 1108 comprises a computer program 1110 which includes codes/computer readable instructions that, when executed by the processor 1106 in the arrangement 1100, cause the hardware arrangement 1100 and/or the electronic device including the hardware arrangement 1100 to perform, for example, flows described above in connection with FIG. 1 or FIG. 5 and any variations thereof.

The computer program 1110 may be configured with computer program codes having, for example, architecture of computer program modules 1110A-1110B. Therefore, the codes in the computer program of the arrangement 1100 may comprise a module 1110A for calculating at least two sets of edge pixels of a first depth image using at least two edge detection algorithms; and a module 1110B for acquiring a final set of edge pixels based on the at least two sets of edge pixels.

The computer program modules may substantially perform the various actions in the flow shown in FIG. 1 or FIG. 5 to simulate the apparatus. In other words, when different computer program modules are executed in the processor 1106, they may correspond to different units or modules in the apparatus for extracting an edge of an object in a depth image which has been described above in conjunction with FIGS. 2-4.

Although the following code means in the embodiments disclosed above in conjunction with FIG. 11 are implemented as computer program modules that, when executed in the processor 1106, cause the hardware arrangement 1100 to perform the actions described above in connection with FIG. 1 or FIG. 5, in alternative embodiments, at least one of the code means may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), and an EEPROM, and the computer program module may, in an alternative embodiment, be distributed to different computer program products in a form of memory within the device.

It may be understood by those skilled in the art that steps, measures, and solutions in various operations, methods, and flows which have been discussed in the present disclosure may be alternated, modified, combined, or deleted. Further, other steps, measures, and solutions in various operations, methods, and flows which have been discussed in the present disclosure may also be alternated, modified, rearranged, decomposed, combined, or deleted. Further, steps, measures, and solutions in various operations, methods, and processes disclosed in the present disclosure in the related art may also be alternated, changed, rearranged, decomposed, combined, or deleted.

The embodiments of the present disclosure provide a method and apparatus for extracting an edge of an object in a depth image, a storage medium, and a computer device, which calculate at least two sets of edge pixels of a first depth image using at least two edge detection algorithms, and acquires a final set of edge pixels in combination with the at least two sets of edge pixels. Compared with the related art, the solutions according to the embodiments of the present disclosure are simple to implement, and may obtain a more accurate set of edge pixels, thereby obtaining a pixel-level segmentation result.

In addition, the solutions according to the embodiments of the present disclosure further achieve the purpose of removing noise by fusing the multiple frames of depth images, thereby obtaining a more stable and accurate segmentation result.

The solutions according to the embodiments of the present disclosure may be used for sample collection, automatic labeling, machine learning, and acquisition of GroundTruth and generation of training data of deep learning etc.

Of course, not all of the advantages described above need to be achieved at the same time by implementing any of the products or methods according to the present disclosure. Other features and advantages of the present disclosure have been set forth in part in the above embodiments, and may be apparent in part from the embodiments of the present specification, or may be understood by implementing the present disclosure.

It may be understood by those of ordinary skill in the art that all or some of the steps in the methods disclosed above, systems, and functional blocks/units in the apparatuses disclosed above may be implemented as software, firmware, hardware, and suitable combinations thereof. In a hardware implementation, division of functional modules/units mentioned in the above description does not necessarily correspond to division of physical components; for example, one physical component may have multiple functions, or one function or step may be performed cooperatively by several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on a computer readable medium, which may comprise a computer storage medium (or a non-transitory medium) and a communication medium (or a transitory medium). It is well known to those skilled in the art the term computer storage medium comprises volatile and nonvolatile media or removable and non-removable media implemented in any method or technology for storing information (for example, computer readable instructions, data structures, program modules or other data). The computer storage medium comprises, but not limited to, a Random Access Memory (RAM), a Random Only Memory (ROM), an Electrically Erasable Programmable Read Only Memory (EEPROM), a flash memory or other memory technology, a Compact Disc (CD)-ROM, a Digital Versatile Disc (DVD) or other optical disc storage, magnetic cartridge, magnetic tape, magnetic disk storage or other magnetic storage apparatus, or may be any other medium which is used to store desired information and may be accessed by the computer. Further, it is well known to those skilled in the art that the communication medium typically comprises computer readable instructions, data structures, program modules, or other data in a modulated data signal, such as a carrier wave or other transport mechanism, and may comprise any information delivery media.

Although the implementations have been disclosed above in the present disclosure, the content described is merely implementations used to facilitate the understanding of the present disclosure, and are not intended to limit the present disclosure. Any modification or variation in the form and details of the implementations may be made by those skilled in the art without departing from the spirit and scope of the present disclosure, but the patent protection scope of the present disclosure should be defined by the scope of the appended claims.

We claim:

1. A processor-implemented method for extracting an edge of an object in a depth image, the method comprising:
    calculating, by a processor, at least two sets of edge pixels of a first depth image using at least two edge detection algorithms; and
    acquiring, by the processor, a final set of edge pixels based on the at least two sets of edge pixels;
    wherein the step of calculating, by the processor, at least two sets of edge pixels of a first depth image using at least two edge detection algorithms comprises:
        determining, by the processor, the at least two edge detection algorithms;
        determining, by the processor, a number of frames to be processed for each of the edge detection algorithms based on weight values preset for the edge detection algorithms; and
        calculating, by the processor, using the determined edge detection algorithms, relevant depth images related to the first depth image according to the respective determined numbers of frames to obtain sets of edge pixels; and
    wherein the step of acquiring, by the processor, a final set of edge pixels based on the at least two sets of edge pixels comprises performing, by the processor, the following processing for each pixel in the first depth image: including, by the processor, the pixel in the final set of edge pixels when a number of sets of edge pixels containing the pixel exceeds a first preset threshold.

2. The method according to claim 1, wherein before calculating, by the processor, at least two sets of edge pixels of a first depth image using at least two edge detection algorithms, the method further comprises:
    determining, by the processor, at least one frame of a relevant depth image related to a depth image to be segmented; and
    fusing, by the processor, the determined relevant depth image with the depth image to be segmented for one or more times to obtain the first depth image.

3. The method according to claim 1, wherein the at least two sets of edge pixels comprise a base set of edge pixels and at least one other set of edge pixels.

4. The method according to claim 3, wherein the step of acquiring, by the processor, a final set of edge pixels based on the at least two sets of edge pixels comprises:
    compensating for, by the processor, the base set of edge pixels with the at least one other set of edge pixels to obtain the final set of edge pixels,
    wherein the base set of edge pixels is calculated using a first edge detection algorithm, and the at least one other set of edge pixels is calculated using at least one other edge detection algorithm.

5. The method according to claim 4, wherein the step of compensating for, by the processor, the base set of edge pixels with the at least one other set of edge pixels comprises:
    adding, by the processor, the base set of edge pixels to the final set of edge pixels; and
    performing, by the processor, the following processing for the at least one other set of edge pixels: selecting, from the other sets of edge pixels, a pixel directly connected to a pixel in the final set of edge pixels and adding the pixel to the final set of edge pixels.

6. The method according to claim 4, wherein the first edge detection algorithm is to extract pixels having a depth value of zero.

7. The method according to claim 4, wherein the final set of edge pixels forms at least one edge-closed pattern.

8. The method according to claim 1, wherein the step of acquiring, by the processor, a final set of edge pixels based on the at least two sets of edge pixels comprises:
    taking, by the processor, a union of the at least two sets of edge pixels as the final set of edge pixels.

9. The method according to claim 1, wherein the step of acquiring, by the processor, a final set of edge pixels based on the at least two sets of edge pixels comprises performing the following processing for each pixel:
    including, by the processor, the pixel in the final set of edge pixels when a number of sets of edge pixels containing the pixel exceeds a second preset threshold.

10. The method according to claim 1, further comprising:
    performing, by the processor, connected domain analysis on the final set of edge pixels to obtain a segmentation result.

11. The method according to claim 10, further comprising:
    de-noising, by the processor, the segmentation result according to priori information.

12. A computer readable storage medium having stored thereon a computer program which, when executed by a processor, implement steps of the method according to claim 1.

13. An apparatus for extracting an edge of an object in a depth image, the apparatus comprising:
    a processor; and
    a memory having stored thereon instructions which, when executed by the processor, cause the processor to:

calculate at least two sets of edge pixels of a first depth image using at least two edge detection algorithms; and acquire a final set of edge pixels based on the at least two sets of edge pixels;

wherein the step of calculating, by the processor, at least two sets of edge pixels of a first depth image using at least two edge detection algorithms comprises:

determining, by the processor, the at least two edge detection algorithms;

determining, by the processor, a number of frames to be processed for each of the edge detection algorithms based on weight values preset for the edge detection algorithms; and calculating, by the processor, using the determined edge detection algorithms, relevant depth images related to the first depth image according to the respective determined numbers of frames to obtain sets of edge pixels; and wherein the step of acquiring, by the processor, a final set of edge pixels based on the at least two sets of edge pixels comprises performing, by the processor, the following processing for each pixel in the first depth image: including, by the processor, the pixel in the final set of edge pixels when a number of sets of edge pixels containing the pixel exceeds a first preset threshold.

14. The apparatus according to claim 13, wherein the instructions, when executed by the processor, further cause the processor to:

determine at least one frame of relevant depth image related to a depth image to be segmented; and fuse the determined relevant depth image with the depth image to be segmented for one or more times to obtain the first depth image.

15. The apparatus according to claim 13, wherein the at least two sets of edge pixels comprise a base set of edge pixels and at least one other set of edge pixels.

16. The apparatus according to claim 15, wherein the instructions, when executed by the processor, further cause the processor to:

compensate for the base set of edge pixels with the at least one other set of edge pixels to obtain the final set of edge pixels, wherein the base set of edge pixels is calculated using a first edge detection algorithm, and the at least one other set of edge pixels is calculated using at least one other edge detection algorithm.

17. The apparatus according to claim 13, wherein the instructions, when executed by the processor, further cause the processor to:

take a union of the at least two sets of edge pixels as the final set of edge pixels.

18. The apparatus according to claim 13, wherein the instructions, when executed by the processor, further cause the processor to perform the following processing for each pixel:

including the pixel in the final set of edge pixels when a number of sets of edge pixels containing the pixel exceeds a second preset threshold.

19. The apparatus according to claim 13, wherein the instructions, when executed by the processor, further cause the processor to:

add the base set of edge pixels to the final set of edge pixels; and perform the following processing for the at least one other set of edge pixels: selecting, from the other sets of edge pixels, a pixel directly connected to a pixel in the final set of edge pixels and adding the pixel to the final set of edge pixels.

* * * * *